March 1, 1938. J. G. CAMERON Re. 20,663

TAMPING AND ROLLING MACHINE OPERATED BY VIBRATION

Original Filed June 7, 1929 3 Sheets-Sheet 1

Inventor
James G. Cameron
By Bair & Freeman
Attorneys

March 1, 1938. J. G. CAMERON Re. 20,663

TAMPING AND ROLLING MACHINE OPERATED BY VIBRATION

Original Filed June 7, 1929 3 Sheets-Sheet 2

Inventor
James G. Cameron
By Bair & Freeman
Attorneys

March 1, 1938. J. G. CAMERON Re. 20,663

TAMPING AND ROLLING MACHINE OPERATED BY VIBRATION

Original Filed June 7, 1929 3 Sheets-Sheet 3

Witness
H. S. Munzenmaier

Inventor
James G. Cameron
By Baur, Freeman & Sinclair
Attorneys

Reissued Mar. 1, 1938

Re. 20,663

UNITED STATES PATENT OFFICE 20,663

TAMPING AND ROLLING MACHINE OPERATED BY VIBRATION

James Grant Cameron, Aberfoyle, Scotland

Original No. 1,819,866, dated August 18, 1931, Serial No. 369,199, June 7, 1929. Application for reissue August 17, 1933, Serial No. 685,620. In Great Britain June 27, 1928

4 Claims. (Cl. 94—48)

My invention relates to improvements in and connected with tamping and rolling machines operated by vibration and is based on the principle of a fly-wheel off the balance and running at speed setting up vibration, all as hereinafter described with reference to the drawings and pointed out in the claims.

In order that my invention may be properly understood and readily carried into effect, I have hereunto appended two sheets of drawings, of which:

The machine consists of a roller or wheel or a series of rollers or wheels A with handle B similar to a hand garden roller. The shaft C inside the rollers A runs free in the rollers or wheels A and also in the arms D at each side of the rollers or wheels A. The handle B being attached to the outside arms D. The arms D are connected to each other by a cross-bracket E to which there is fixed a petrol engine F which (through a gear-box if desired) by means of sprocket-wheels G and fixed respectively on the engine crank-shaft I and the free-shaft C in the rollers or wheels A and a chain J rotates the free shaft C in the rollers A, or the petrol engine may be fixed to any other convenient part of the machine.

At the front of the rollers or wheels A, there is a flat bottomed metal base K attached to the free shaft C in the rollers or wheels A by one or two rocking arms L, the shaft still running free in these arms L. The top of the metal base K is formed to carry a shaft M and on this shaft M there is or are keyed one or more off-the-balance-fly-wheels N (the shaft is off dead centre in the wheel or wheels, or they are weighted on one side). Fixed to this shaft M there is a sprocket-wheel O, and by means of a sprocket-wheel P on free running shaft C in rollers or wheels A and a chain Q, this shaft M carrying the off-the-balance-fly-wheels N will be driven by the engine through the free running shaft C in the rollers or wheels A. The rotation of this shaft C carrying the off-the-balance-wheels N will set up vibration, which vibration will be communicated to the material being packed in a tamping or dancing motion by the shaft M carrying the base K with it, lateral shock being taken up through the arms L by the free running shaft C in the rollers or wheels A. Suitable springs S are fixed between the rocking-arms L and an extension bracket T forming part of cross-bracket E to provide a damper against excessive vibration of the rocking-arm L.

Figure 1:
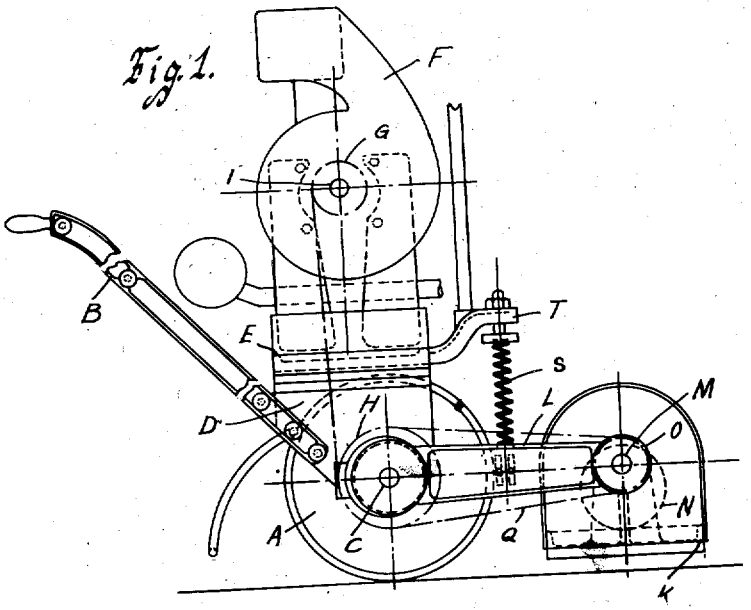
Figure 1 is a side elevation of a machine illustrating my invention.
Figure 4:
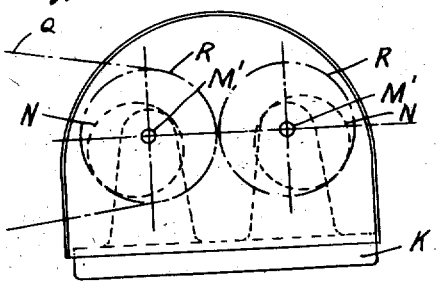
Figure 4 is a side view of the tamping arrangement showing two shafts carrying off-the-balance-fly-wheels.
Figure 2:
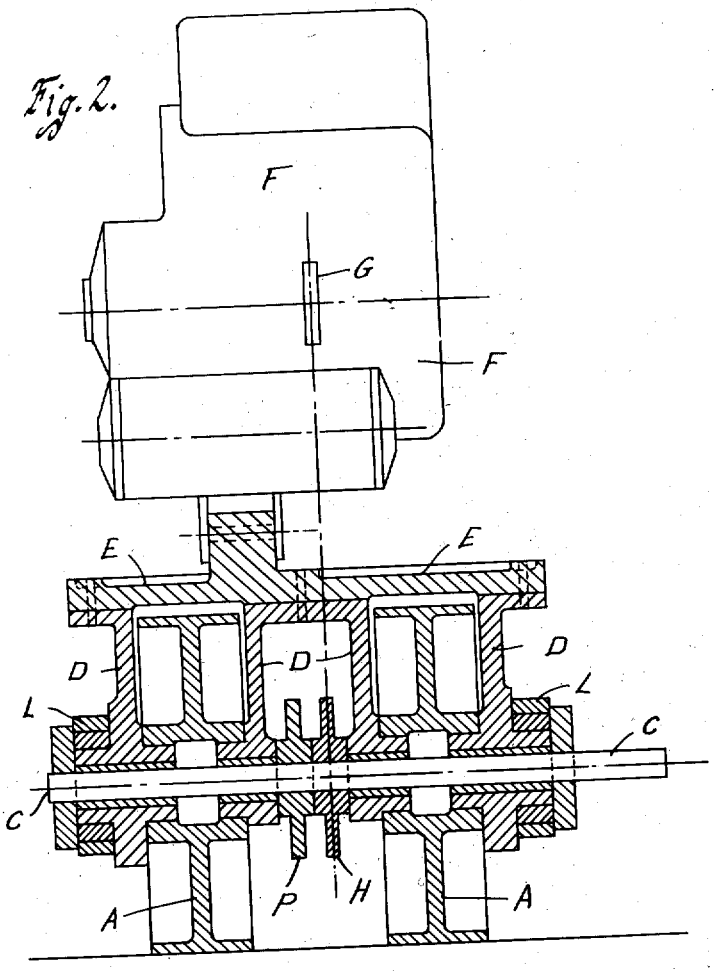
Figure 2 is a cross section through the roller-shaft.
Figure 3:
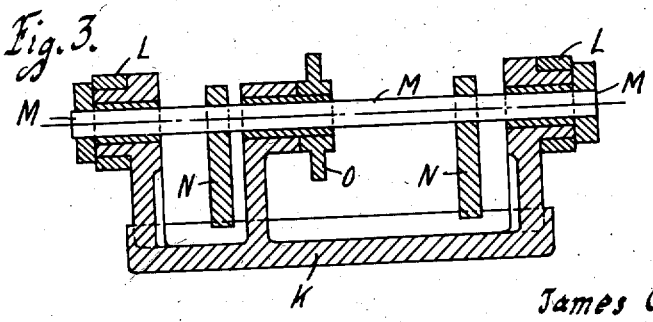
Figure 3 is a cross section through the tamping arrangement.

With reference to the tamping arrangement, Figure 4, this shows a base K supported by two shafts M' suitably geared together by gear wheels R suitably fixed to the shafts M', these shafts M' being driven by the chain Q. Each shaft M' has two or more out-of-balance-fly-wheels N fixed thereto so as to work synchronously, i. e., these eccentric fly-wheels N are so relatively connected together by the gear wheels R that they simultaneously and equally advance toward and recede from each other during the operation of the device and effect a combined tamping action.

In place of having one large tamping base K for wide areas, this may be made in sections in order to secure greater contact on irregular ground, each section may have an independent drive from shaft C.

Figure 5:
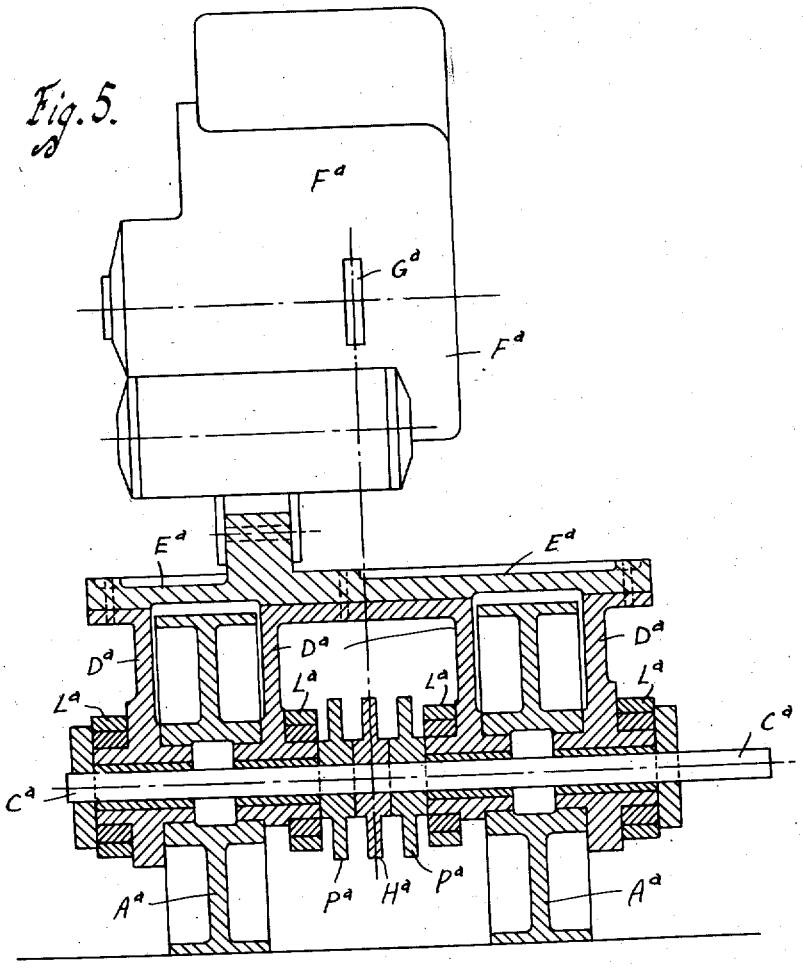
Figure 5 is a cross section through the roller shaft of a form of my device in which the tamping base is made in sections.
Figure 6:
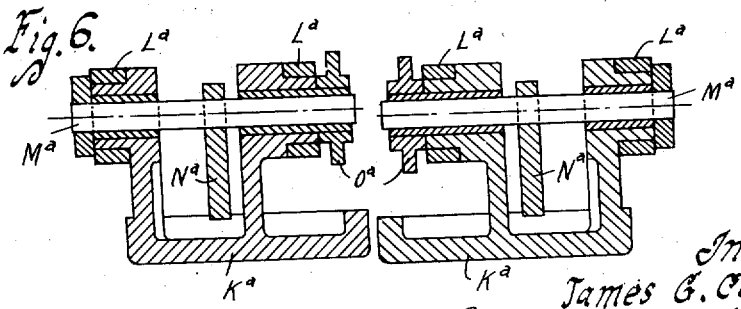
Figure 6 is a cross section through the tamping arrangement of the form of device illustrated in Figure 5.

Such a form of my device is illustrated in Figures 5 and 6 in which the parts, corresponding to those already referred to are indicated by reference characters, such as have heretofore been used, with the addition of "a".

Thus it will be seen that the structure of Figures 5 and 6 has the rollers $A^a$ and the chafts $C^a$ similar to the roller A and shaft C except that the shaft $C^a$ is a little longer to allow for the interposition of an additional sprocket $P^a$.

The tamping base is divided into sections $K^a$ and necessarily the shaft M is divided into sections $M^a$. Each section has a sprocket $O^a$ and is mounted in suitable bearings on its base section $K^a$.

My invention will be specially suitable for the tamping of concrete, packing of filled in ditches, drains, and such like, tamping in of tar macadam, asphalt, and the like on roads and for the tamping in or filling up of pot-holes in roads and also in gardening foot-paths and inside buildings.

The advantages obtained by my invention are that a tamping motion is superior for the packing of material to that of rolling it in by a slow moving weight, much greater solidification being obtained. The machine can be made in any size, is portable, can be moved about and worked by one man, is cheap to construct, easily operated, and will have a long working life as the engine is isolated from all shock of the vibration.

This is due in part to the fact that in the form of my device illustrated in Figure 4, the horizontal vibrations tend to be damped or neutralized, while the vertical vibrations of the plurality of off-center members tend to be cumulative.

It is also in part due to the fact that the vibrating element K is loosely hung from the bracket T in such manner as to reduce the transmission of vibrations to the engine and the main frame.

As the engine is only driving the shaft carrying the fly-wheels-off-the-balance, a very low H. P. is required. As the vibrations are delivered to the material being tamped at a very high number of blows per minute, the machine can be pushed about by a man as desired when engine is working. When moving from one place to another with engine stationary, the metal base forming the tamper will, by means of a metal rod attached to the framework carrying the petrol tank and to the top of the tamper, be lifted clear of the ground.

The machine may be provided with suitable means by which the engine can be suitably geared to enable the machine to be mechanically driven.

I claim as my invention:

1. A tamping and rolling machine comprising a bracket, a shaft rotatably mounted in said bracket, rollers freely mounted on said shaft for supporting said bracket, a pair of arms freely mounted on said shaft at each side of the rollers, a cross-bracket connecting the arms together, a metal base having upstanding bearings supported by the free ends of said arms, a shaft freely carried by said bearings, an off-balance flywheel keyed to said second shaft, means carried by said bracket for driving said first shaft, and a driving connection between the two shafts.

2. A plurality of bases adapted to be vibrated, shafts mounted on said bases, an eccentric weight on each shaft, the weights extending from the shafts in the same angular direction, the shafts being set in approximate tandem alignment with each other.

3. A tamping base comprising a plurality of sections, a plurality of vibrating means for imparting vibration to the respective sections, and means for operating the vibrating means in synchronism with each other.

4. A plurality of bases adapted to be vibrated, shafts mounted on said bases, an eccentric weight on each shaft, the shafts being set in approximate tandem alignment with each other, means for operating the shafts in synchronism with each other.

J. G. CAMERON.